United States Patent [19]
Smith

[11] Patent Number: 5,133,789
[45] Date of Patent: Jul. 28, 1992

[54] EXPANDABLE FILTER ASSEMBLY

[76] Inventor: Mark G. Smith, 5255 Shattalon Dr., Box 139, Winston-Salem, N.C. 27106

[21] Appl. No.: 791,145

[22] Filed: Nov. 13, 1991

[51] Int. Cl.⁵ .............................................. B01D 46/00
[52] U.S. Cl. ........................................ 55/491; 55/493; 55/496; 55/511
[58] Field of Search ............... 55/491, 493, 495, 496, 55/501, 506, 508, 511

[56] References Cited

U.S. PATENT DOCUMENTS

| | | | |
|---|---|---|---|
| 2,754,928 | 7/1956 | Hambrecht et al. | 55/491 X |
| 3,019,854 | 2/1962 | O'Bryant | 55/491 X |
| 3,950,157 | 4/1976 | Mathely | 55/491 X |
| 4,042,503 | 8/1977 | Justus | 210/428 |
| 4,277,901 | 10/1980 | Lange | 210/728 |
| 4,493,718 | 1/1985 | Schweizer | 55/491 |
| 4,504,390 | 3/1985 | Steffen | 210/428 |
| 4,762,053 | 8/1988 | Wolfert | 55/493 X |

Primary Examiner—Charles Hart
Attorney, Agent, or Firm—Terry M. Gernstein

[57] ABSTRACT

A filter assembly includes a filter media unit and a frame unit. The frame unit is expandable and contractible whereby various filter media unit sizes can be accommodated. The frame unit includes a plurality of crossed legs that are pivotally connected together, and snap fastener assemblies are used to releasably attach the frame unit to the filter media unit body. Locking pivot pins can be used to attach adjacent legs together.

7 Claims, 3 Drawing Sheets

EXPANDABLE FILTER ASSEMBLY

TECHNICAL FIELD OF THE INVENTION

The present invention relates to the general art of filter media, and to the particular field of filter media used in heating and air conditioning systems.

BACKGROUND OF THE INVENTION

Many residences and offices have some form of heating and air conditioning system. These systems generally have duct work fluidically connecting a fan unit with the remainder of the building. This duct work can be formed of several standard sizes, yet may vary in size slightly from one system to another.

Nearly every heating and air conditioning system requires some sort of filter assembly to ensure that the air directed to the building is free of dust and other contaminants. These filters are generally slipped into the duct work near the fan unit.

As the filter assemblies operates, they become fouled and must be cleaned or replaced on a periodic basis. This requires removing the filter assembly, inspecting it to determine if it can be cleaned or if it must be replaced.

Due to the varying size of duct work associated with many buildings, the people in charge of the heating and air conditioning system may often be required to order or store special filter assemblies that are adapted to the exact size of their special heating and air conditioning duct work. This may require the ordering of special filters, modifying and customizing of off-the-shelf filter assemblies. In turn, this may require a supplier to stock special filter assemblies for the special needs of a certain customer.

Therefore, the need or desire to use a filter assembly that exactly fits the special heating and air conditioning system duct work may result in added expense for either the building owner or the supplier, or both. In some instances, the special customizing may make servicing difficult and expensive.

Therefore, there is a need for a filter assembly that can be used in a heating and air conditioning system that can be easily and efficiently modified to meet the exact needs of a particular system. Further, there is a need for such a filter assembly that can be easily stored, installed, removed, serviced and replaced.

OBJECTS OF THE INVENTION

It is a main object of the present invention to provide a filter assembly that can be used in a heating and air conditioning system that can be easily and efficiently modified to meet the exact needs of a particular system.

It is another object of the present invention to provide a filter assembly that can be used in a heating and air conditioning system that can be easily and efficiently modified to meet the exact needs of a particular system and that can be easily stored, installed, removed, serviced and replaced.

SUMMARY OF THE INVENTION

These, and other, objects are achieved by a filter assembly that includes a filter media body with a flexible frame that is expandable and contractible and is releasably attachable to the filter media body. The filter media body includes means for releasably attaching the frame thereto whereby the media body can be removed from the frame for storage, servicing or replacement. The media can be various sizes, materials or the like to be amenable for use in a wide variety of systems.

BRIEF DESCRIPTION OF THE DRAWING FIGURES

DETAILED DESCRIPTION OF THE PREFERRED EMBODIMENT OF THE INVENTION

Figure 1:
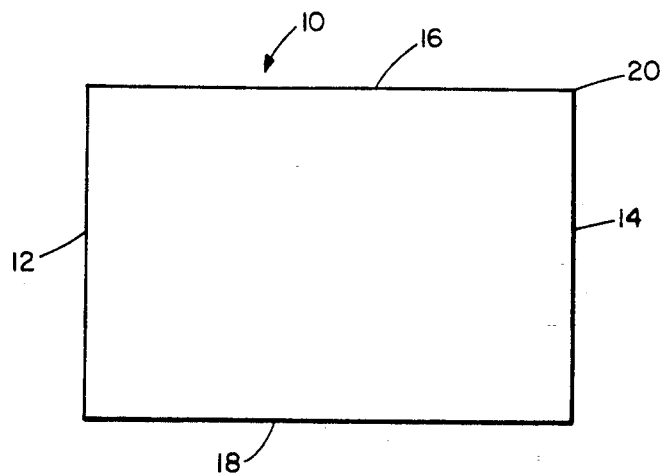
FIG. 1 is a front elevational view of a prior art filter media unit.
Figure 2:
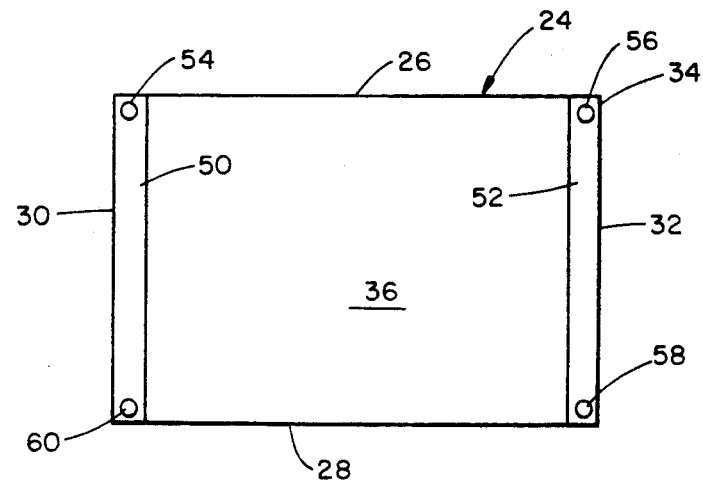
FIG. 2 is a front elevational view of a filter media unit embodying the present invention.
Figure 3:
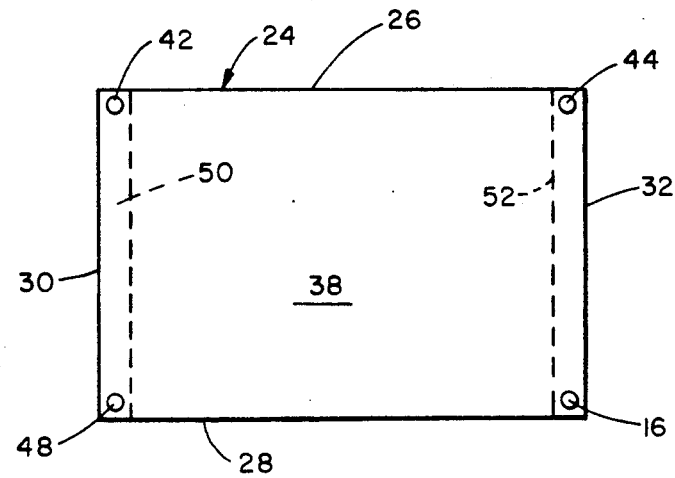
FIG. 3 is a rear elevational view of a filter media unit embodying the present invention.
Figure 4:
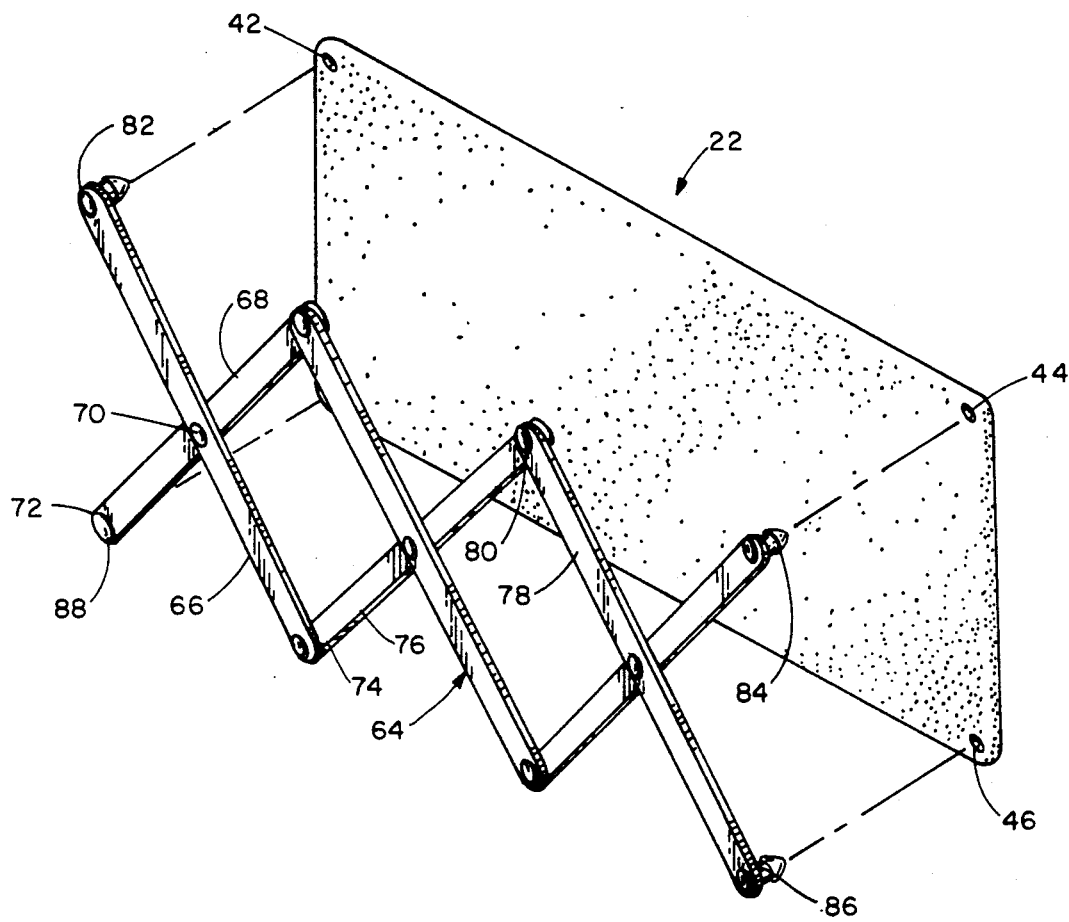
FIG. 4 is an exploded perspective view of the filter assembly of the present invention.
Figure 5:
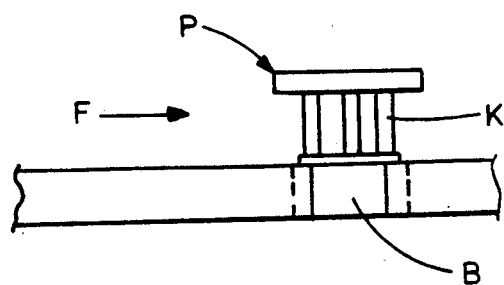
FIG. 5 is an elevational view of a locking pivot fastener that can be used to pivotally attach one leg of a frame unit to an adjacent leg of that frame unit.

Shown in FIG. 1 is a prior art filter media body unit 10. The unit 10 is rectangular in shape with end edges 12 and 14 and side edges 16 and 18 intersecting each other to form corners, such as corner 20. These units are generally available in sizes such as 16"×20", 20"×20", 16"×25", or by 20"×24". These standard units generally have some sort of frame associated therewith so they will hold their shape and dimensions when placed in the duct work of a heating and air conditioning system. Such size variation may require a supplier to maintain a stock of each different size. This is inefficient, and still may not meet special needs of a particular customer.

The filter assembly of the present invention is shown in FIGS. 2 to 6 at reference number 22, and can be adapted for special needs.

The filter assembly 22 includes a filter media unit 24 that has side edges 26 and 28 and end edges 30 and 32 intersecting the side edges to form corners such as corner 34. The unit 24 also includes a front surface 36 and a rear surface 38, and has a thickness dimension defined between the front and rear surfaces. The unit also has a length dimension measured between the end edges 30 and 32, and a width dimension measured between the side edges 26 and 28.

The filter unit also includes fastener-receiving holes 40, 42, 44 and 48 adjacent to the corners and extending through the filter media material. The purpose of the fastener-receiving holes will be understood from the ensuing disclosure.

The filter unit also includes two support strip elements 50 and 52 fixedly attached to the filter media material adjacent to the end edges 30 and 32 and extending for the entire width of the filter media material from one side edge 26 to the other side edge 28. Each support strip element includes a snap fastener socket element, such as elements 54, 56, 58 and 60 mounted thereon in position to be aligned with and to co-operate with the fastener-receiving holes 42, 44, 46 and 48 respectively.

The filter unit 24 can be manufactured in any size, but is usually manufactured in the above-mentioned standard sizes. The filter media unit is sold and stored as is most desirable, and can be stored in plastic wrap for convenient storage and display. For use, the filter media unit is simply removed from the packaging, and extended to the dimension most suitable for the particular heating and air conditioning system duct work in which it will be used.

The filter media unit 24 is therefore flexible. Therefore, the assembly of the present invention includes a frame unit 64 that is expandable and contractible to accommodate filter media units of various sizes. The frame unit is sold and stored separately from the filter media unit, and is expanded to meet the precise needs of the particular filter media unit with which it will be used. In this manner, any size filter media unit can be properly supported without special customizing or modifying. A supplier can stock only standard sizes, or selected sizes, and the customer can modify the filter media unit to meet his or her special requirements.

Figure 6:
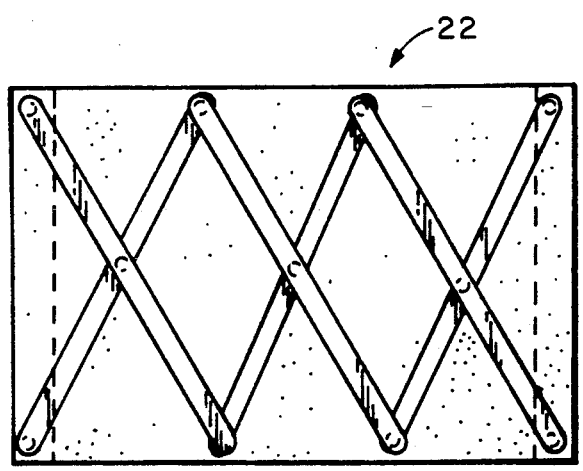
FIG. 6 is a rear elevational view of an assembled filter assembly of the present invention.

The frame unit 64 includes a plurality of cross legs, such as crossed legs 66 and 68 that are pivotally connected together by a pivot fastener, such as pivot pin 70 whereby the frame can be expanded and contracted in the nature of a crossed leg support element. All of the legs are interconnected, with four of the legs, having free ends, such as free end 72 of leg 68. The other legs have the ends thereof, such as end 74 of leg 76 pivotally connected to the end of an adjacent leg, such as leg 78. Suitable pivot fasteners, such as pivot pin 80, are used to connect adjacent legs together. The pivot pins can include special locking elements to limit and control the angle between adjacent legs to thereby control the dimensions of the frame unit. A suitable locking fastener F is illustrated in FIG. 6, and include keys K on the pin P that engage keyways K defined in the legs to open into a bore B defined through the leg. The keys and keyways are flexible and the keys can be moved from one keyway to another to adjust the orientation of one leg relative to another. Plastic is a suitable material for the legs and the pins whereby the keys can move into and out of a keyway, yet will be securely held in place when engaged in a keyway.

Snap fastener ball elements 82, 84, 86 and 88 are attached to the leg free ends. These ball elements extend through the fastener-receiving holes 42, 44, 46 and 48 respectively and are snappingly received in the snap fastener socket elements 54, 56, 58 and 60 respectively to releasably attach the frame unit to the filter media unit. An assembled filter assembly is shown in FIG. 6. The frame unit can be removed from the filter unit by simply pulling the snap fastener balls out of the snap fastener sockets. The filter unit can then be cleaned, serviced or replaced, and then re-assembled to the frame unit by simply forcing the snap fastener balls through the holes in the filter media unit, and into the snap fastener sockets.

It is understood that while certain forms of the present invention have been illustrated and described herein, it is not to be limited to the specific forms or arrangements of parts described and shown.

I claim:
1. A filter assembly comprising:
   A) a filter media unit that includes
      (1) a body having side edges, end edges, corners formed at the intersection of said side edges and said end edges, a length dimension measured between said end edges and a width dimension measured between said side edges,
      (2) a plurality of fastener-receiving holes defined through said body adjacent to each body corner,
      (3) two support strip elements fixed to said body adjacent to each body end edge, and
      (4) snap fastener socket elements mounted in said support strips in position to co-operate with each fastener-receiving hole; and
   B) an expandable and contractible frame unit that includes
      (1) a plurality of crossed legs,
      (2) pivot fastener elements connecting adjacent legs together in a manner that permits said frame unit to expand and to contract, four of said legs having free ends that are not connected to other legs, and
      (3) a snap fastener ball element mounted on each leg free end, each snap fastener ball element being sized and adapted to extend through said filter media unit body and to fit into a snap fastener socket element to releasably attach said frame unit to said filter media unit.

2. The filter assembly defined in claim 1 wherein said pivot fastener elements include pivot pins.

3. The filter assembly defined in claim 2 wherein said pivot pins include keys thereon, and said legs have keyways defined therein into which said keys fit.

4. The filter assembly defined in claim 3 wherein said filter media unit body has a length dimensions of 20" and a width dimension of 16".

5. The filter assembly defined in claim 3 wherein said filter media unit body has a length dimension of 20" and a width dimension of 20".

6. The filter assembly defined in claim 3 wherein said filter media unit body has a length dimension of 25" and a width dimension of 16".

7. The filter assembly defined in claim 3 wherein said filter media unit body has a length dimension of 25" and a width dimension of 20".

* * * * *